United States Patent
Suzawa (10) Patent No.: US 8,280,529 B2
(45) Date of Patent: Oct. 2, 2012

(54) SEQUENCE CONTROL APPARATUS AND TEST APPARATUS

(75) Inventor: Hideyuki Suzawa, Saitama (JP)

(73) Assignee: Advantest Corporation, Tokyo (JP)

( * ) Notice: Subject to any disclaimer, the term of this patent is extended or adjusted under 35 U.S.C. 154(b) by 244 days.

(21) Appl. No.: 12/709,381

(22) Filed: Feb. 19, 2010

(65) Prior Publication Data

US 2010/0211193 A1 Aug. 19, 2010

Related U.S. Application Data

(63) Continuation of application No. PCT/JP2008/002147, filed on Aug. 7, 2008.

(30) Foreign Application Priority Data

Aug. 27, 2007 (JP) ................................. 2007-219481

(51) Int. Cl.
*G05B 11/01* (2006.01)

(52) U.S. Cl. ................. 700/14; 700/23; 700/24; 700/25

(58) Field of Classification Search .................... 700/12, 700/14, 19, 23, 24, 25
See application file for complete search history.

(56) References Cited

U.S. PATENT DOCUMENTS

| | | | |
|---|---|---|---|
| 4,310,889 A | | 1/1982 | Imai et al. |
| 4,668,878 A | * | 5/1987 | Wyss ............................ 307/141 |
| 5,610,809 A | * | 3/1997 | Morita ............................ 700/23 |
| 6,658,303 B2 | * | 12/2003 | Hatemata et al. ............... 700/14 |
| 6,757,818 B1 | | 6/2004 | Nishitani |
| 2006/0085085 A1 | * | 4/2006 | Duemler ......................... 700/19 |

FOREIGN PATENT DOCUMENTS

| | | |
|---|---|---|
| JP | 63-60220 B2 | 11/1988 |
| JP | 2621631 B2 | 6/1997 |
| JP | 3597396 B2 | 12/2004 |
| JP | 3871461 B2 | 1/2007 |

OTHER PUBLICATIONS

International Search Report (ISR) issued in PCT/JP2008/002147 (parent application) for Examiner consideration.
Written Opinion (PCT/ISA/237) issued in PCT/JP2008/002147 (parent application).

* cited by examiner

*Primary Examiner* — Sean Shechtman
(74) *Attorney, Agent, or Firm* — Chen Yoshimura LLP (57) ABSTRACT

There is provided a sequence control apparatus for outputting a sequence of control signals to operate a control target, including a sequence storing section that stores thereon sequence data in association with each state received from outside, where the sequence data includes a plurality of control signals to be sequentially supplied to the control target and a plurality of pieces of time interval information designating time intervals during which the plurality of control signals are respectively kept supplied to the control target, a sequence data selecting section that, on reception of a state from the outside, selects sequence data associated with the state, a sequence reading section that sequentially reads the plurality of control signals and the plurality of pieces of time interval information included in the selected sequence data and sequentially supplies the plurality of control signals to the control target, and a time control section that refers to the plurality of sequentially read pieces of time interval information to control the time intervals during which the plurality of control signals are kept supplied to the control target.

5 Claims, 8 Drawing Sheets

| ADDRESS | | DATA | |
|---|---|---|---|
| UPPER | LOWER | CONTROL SIGNAL | TIME INTERVAL INFORMATION |
| IMMEDIATELY PREVIOUS STATE / NEW STATE | | | |
| 0×9 / 0×A | 0×0 | 0×1 | t1 |
| | 0×1 | 0×5 | t2 |
| | 0×2 | 0×4 | t3 |
| | 0×3 | 0×0 | t4 |
| | 0×4 | 0×2 | t5 |
| | 0×5 | 0×A | 0 |
| | 0×6 | 0×A | 0 |
| | 0×7 | 0×A | 0 |

- SAME AS IMMEDIATELY PREVIOUS CONTROL SIGNAL
- TIME INTERVAL INFORMATION INDICATES MINIMUM TIME INTERVAL

SEQUENCE DATA
SEQUENCE DATA
SEQUENCE DATA

SEQUENCE CONTROL APPARATUS AND TEST APPARATUS

BACKGROUND

1. Technical Field

The present invention relates to a sequence control apparatus and a test apparatus.

2. Related Art

It is known that a sequencer would control the state of a control target (for example, see Patent Documents 1, 2 and 3). Patent Document 1 discloses a sequence control microcontroller that includes a state register for storing thereon, for each channel, a subsequent state according to the condition at the time of the termination of a program and sequentially executes, for each channel, a program corresponding to the state stored on the state register for each channel. Patent Document 2 discloses a programmable controller that divides the entire program into steps, separates the user program into programs representing the transition conditions between the steps and programs representing the operations performed in the steps, and executes a program associated with an active step. Patent Document 3 discloses a controller for controlling a control target, which generates a system event when the controller transits to a next state (for example, when the controller executes a command received from the outside), and performs an event task corresponding to the generated system event.

Patent Document 1: Japanese Patent No. 3871461
Patent Document 2: Japanese Patent No. 2621631
Patent Document 3: Japanese Patent No. 3597396

When a sequencer controls, for example, the pattern of the ON/OFF states of a plurality of relays to transit from a given state (a state X) to the next state (a state Y), the transition from the state X to the state Y may not happen directly but go through one or more intermediate states. In addition, the sequencer may also control the time intervals during which the respective intermediate states are sustained. To perform such a control, the sequencers disclosed in Patent Documents 1, 2 and 3 need control circuits and control programs in correspondence with the respective intermediate states and unavoidably become large in scale.

SUMMARY

Therefore, it is an object of an aspect of the innovations herein to provide a sequence control apparatus and a test apparatus which are capable of overcoming the above drawbacks accompanying the related art. The above and other objects can be achieved by combinations described in the independent claims. The dependent claims define further advantageous and exemplary combinations of the innovations herein.

According to an aspect related to the innovations herein, one exemplary sequence control apparatus for outputting a sequence of control signals to operate a control target may include a sequence storing section that stores thereon sequence data in association with each state received from outside, where the sequence data includes a plurality of control signals to be sequentially supplied to the control target and a plurality of pieces of time interval information designating time intervals during which the plurality of control signals are respectively kept supplied to the control target, a sequence data selecting section that, on reception of a state from the outside, selects sequence data associated with the state, a sequence reading section that sequentially reads the plurality of control signals and the plurality of pieces of time interval information included in the selected sequence data and sequentially supplies the plurality of control signals to the control target, and a time control section that refers to the plurality of sequentially read pieces of time interval information to control the time intervals during which the plurality of control signals are kept supplied to the control target. There is also provided a test apparatus including the above-described sequence control apparatus.

According to an aspect related to the innovations herein, one exemplary sequence control apparatus for outputting a sequence of control signals to operate a control target may include a sequence storing section that stores thereon sequence data in association with each pair of a state received from outside and an immediately previously received state, where the sequence data includes a plurality of control signals to be sequentially supplied to the control target, a sequence data selecting section that, on reception of a state from the outside, selects sequence data associated with a pair of the state newly received and an immediately previously received state, and a sequence reading section that sequentially reads the plurality of control signals included in the selected sequence data and sequentially supplies the plurality of control signals to the control target. Here, the sequence data selecting section includes a state storing section that stores thereon an immediately previously received state, a state monitoring section that detects a state change when a state newly received is different from the immediately previously received state stored on the state storing section, and a selecting section that, when the state monitoring section detects the state change, selects the sequence data associated with a pair of the newly received state and the immediately previously received state. There is also provided a test apparatus including the above-described sequence control apparatus.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
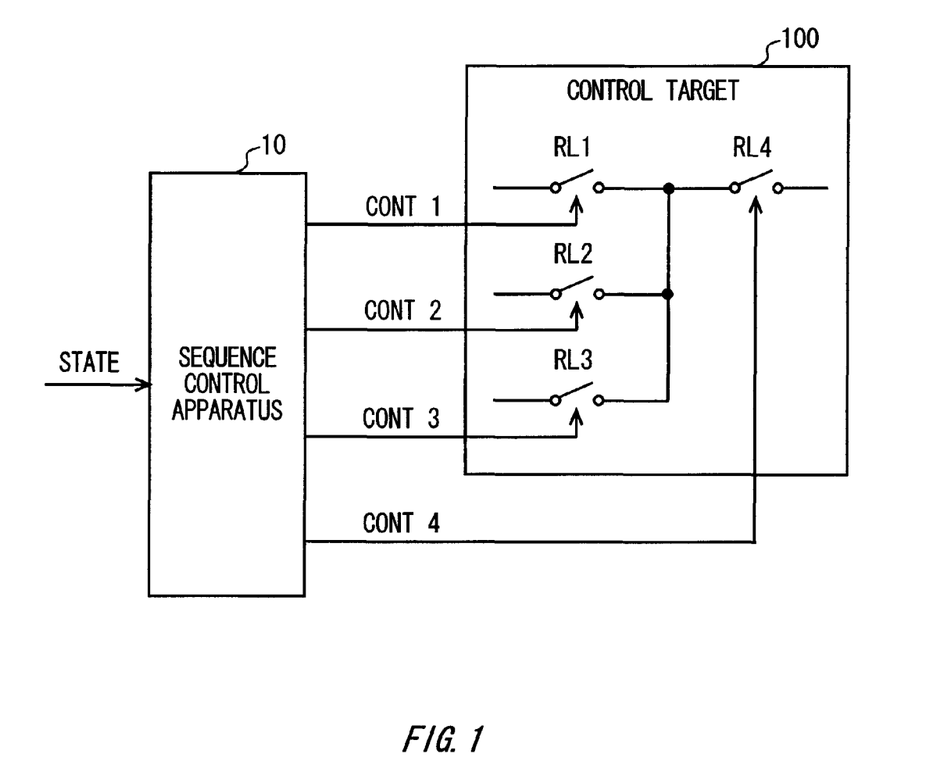
FIG. 1 illustrates a sequence control apparatus 10 relating to an embodiment of the present invention, together with a control target 100.

FIG. 1 illustrates a sequence control apparatus 10 relating to an embodiment of the present invention, together with a control target 100. The sequence control apparatus 10 outputs a sequence of control signals to operate the control target 100. More specifically, the sequence control apparatus 10 receives the state of the control target 100 from the outside and outputs a sequence of control signals to cause the control target 100 to transit from the current state to the received state. The sequence control apparatus 10 may control a plurality of relays (RL1, RL2, RL3, and RL4) included in the control target 100 to transit between the ON/OFF states, for example.

Figure 2:
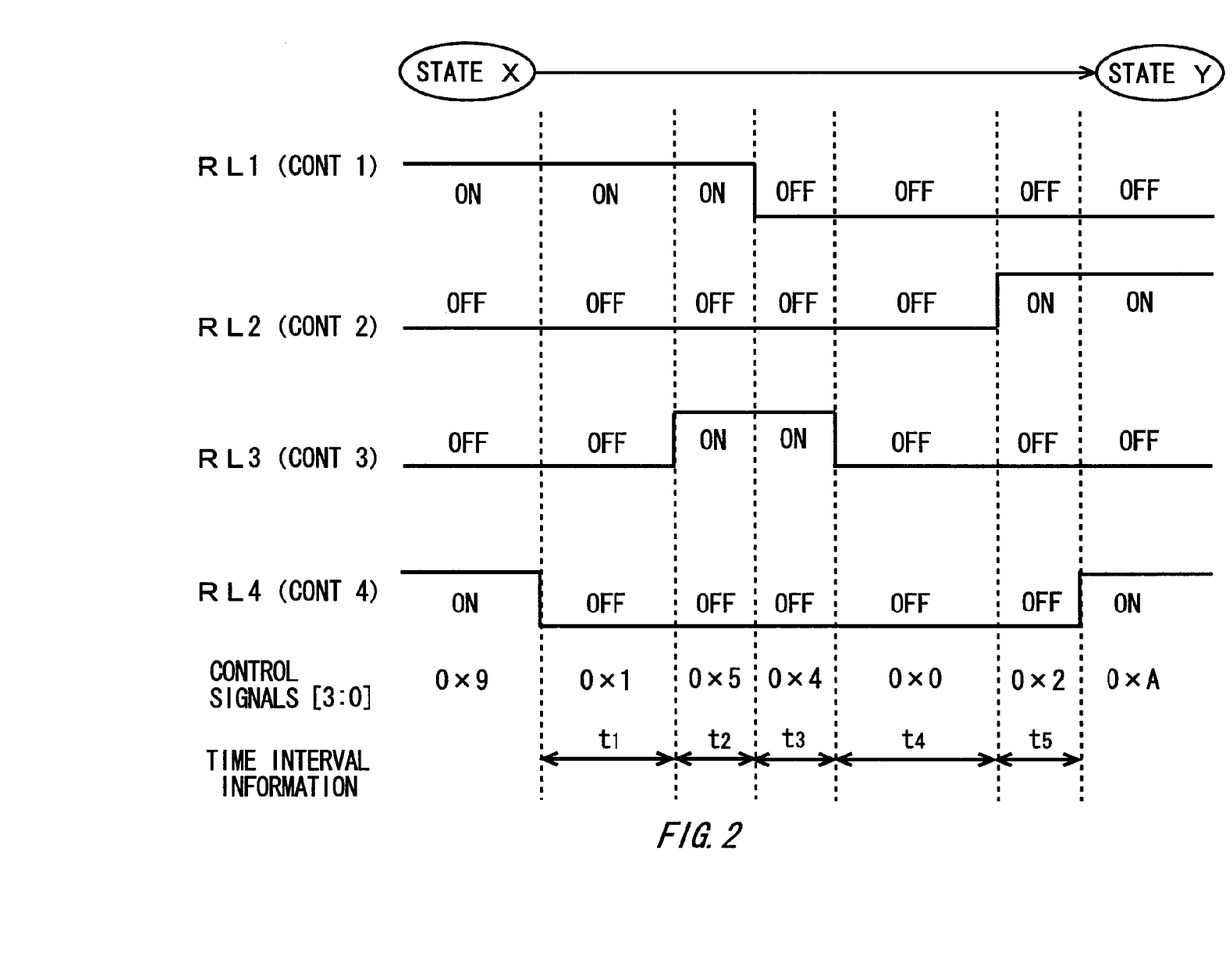
FIG. 2 illustrates an exemplary control sequence output to the control target 100 including a plurality of relays (RL1 to RL4).

FIG. 2 illustrates an exemplary control sequence output to the control target 100 including a plurality of relays (RL1 to RL4). The sequence control apparatus 10 controls the control target 100 to transit from a given state (a state X) to the next state (a state Y) through one or more intermediate states sequentially.

For example, when the relays (RL1, RL2, RL3, and RL4) included in the control target 100 are in the state X (ON, OFF, OFF, and ON), on reception of an instruction from the outside to transit to the state Y (OFF, ON, OFF and ON), the sequence control apparatus 10 controls the control target 100 to go through the intermediate states in the sequence shown in FIG. 2 between the state X and the state Y. Specifically speaking, for example, the sequence control apparatus 10 may control the relays to transit from the state X (ON, OFF, OFF and ON) to the state Y (OFF, ON, OFF, and ON) through the intermediate states (ON, OFF, OFF, and OFF), (ON, OFF, ON, and OFF), (OFF, OFF, ON, and OFF), (OFF, OFF, OFF, and OFF), and (OFF, ON, OFF, and OFF) in the stated sequence.

To control the control target 100 in the above-described manner, the sequence control apparatus 10 outputs to the control target 100 a particular sequence of control signals that is determined by the pair of the state newly received from the outside and the immediately previous state. Furthermore, the sequence control apparatus 10 controls the time intervals during which the respective intermediate states are sustained, according to a plurality of pieces of time interval information determined for the control signals.

Figure 3:
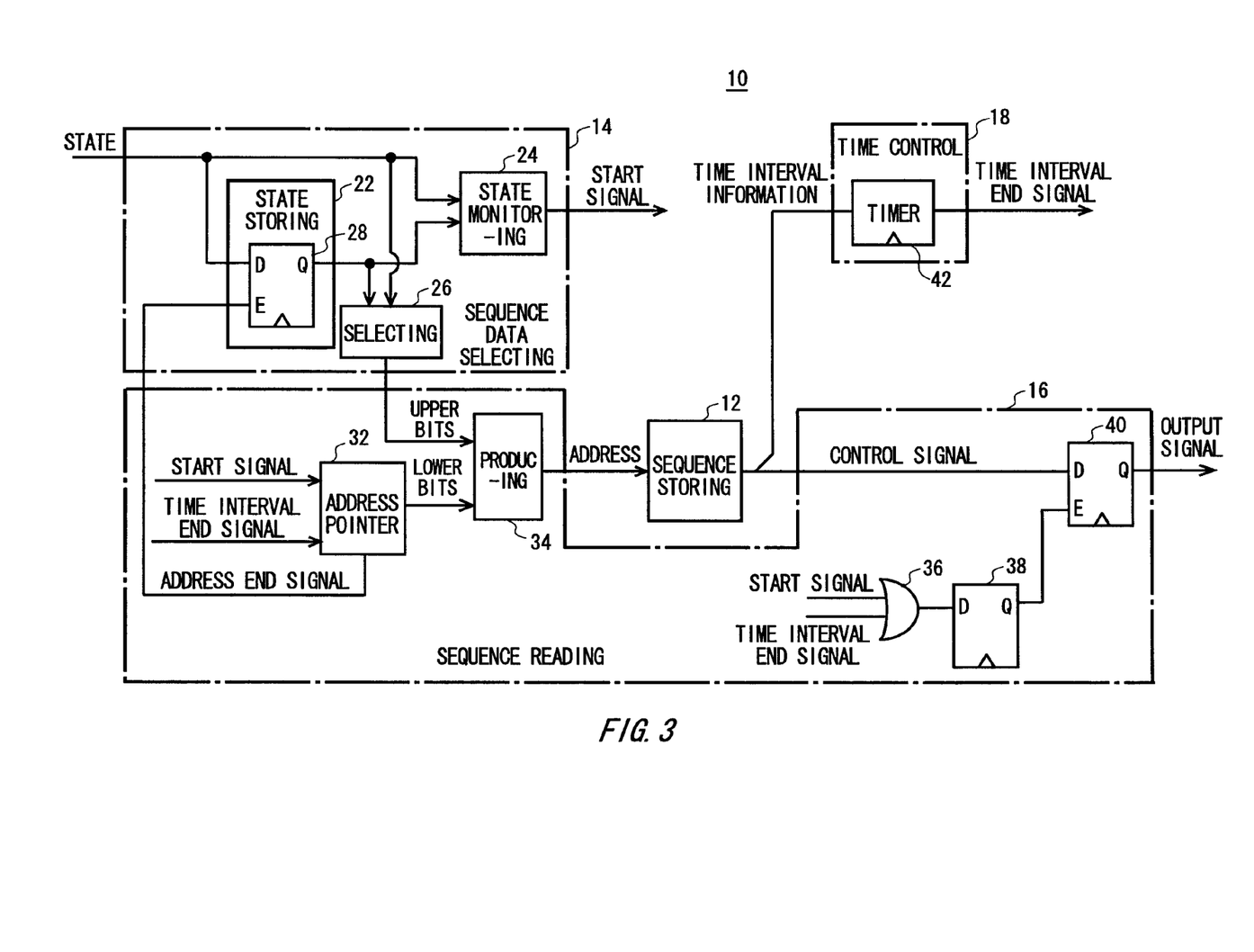
FIG. 3 illustrates the configuration of the sequence control apparatus 10 relating to the embodiment of the present invention.
Figure 4:
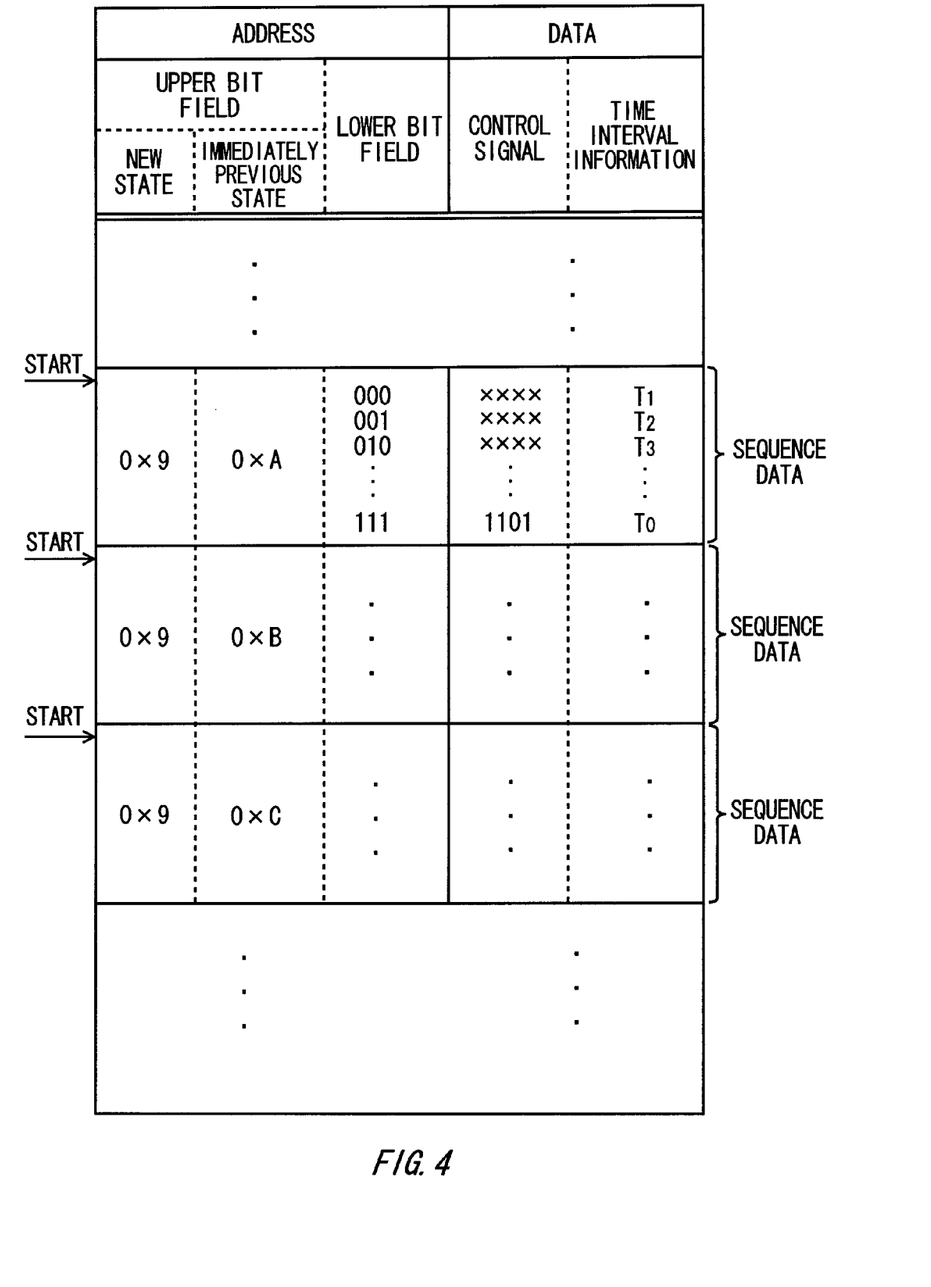
FIG. 4 illustrates exemplary data stored on a sequence storing section 12 relating to the embodiment of the present invention.

FIG. 3 illustrates the configuration of the sequence control apparatus 10 relating to the embodiment of the present invention. FIG. 4 illustrates exemplary data stored on a sequence storing section 12 relating to the embodiment of the present invention.

The sequence control apparatus 10 includes a sequence storing section 12, a sequence data selecting section 14, a sequence reading section 16, and a time control section 18. The sequence control apparatus 10 receives a state from the outside, and sequentially outputs control signals to control the control target 100 to transit to the received state.

The sequence storing section 12 stores thereon a plurality of pieces of sequence data in association with various states newly received from the outside and various states immediately previously received. The sequence data includes a plurality of control signals to be sequentially supplied to the control target 100 and a plurality of pieces of time interval information indicative of the time intervals during which the respective control signals are kept supplied to the control target 100. Stated differently, the sequence storing section 12 stores sequence data in association with each pair of a state newly received from the outside and a state immediately previously received from the outside. For example, the sequence storing section 12 may divide the data region into an upper bit field and a lower bit field, stores the control signals in one of the bit fields (for example, the upper bit field) and store the corresponding pieces of time interval information on the other bit field (for example, the lower bit field).

In the present embodiment, the sequence storing section 12 stores, on a plurality of successive addresses, a plurality of control signals and a plurality of pieces of time interval information included in each piece of sequence data, as shown in FIG. 4. Thus, the sequence storing section 12 enables the control signals and the pieces of time interval information included in each piece of sequence data to be successively read, for example, by first designating a start address and subsequently increments the designated address by one from the start address.

In the present embodiment, the sequence data stored on the sequence storing section 12 includes a predetermined number of control signals and a predetermined number of pieces of time interval information as shown in FIG. 4. Thus, when the address is designated in increments of one from the start address during a read operation, for example, the sequence storing section 12 can assure that all of the control signals and all of the pieces of time interval information included in the sequence data are read by stopping the reading operation when the increment from the start address reaches a predetermined value. More specifically, the sequence data stored on the sequence storing section 12 includes $2^n$ control signals and $2^n$ pieces of time interval information (n is an integer of 1 or larger) as shown in FIG. 4. Thus, the sequence storing section 12 can use the n-bit lower bit fields of binary addresses to designate the control signals and the pieces of time interval information included in sequence data.

Furthermore, the sequence storing section 12 may store each piece of sequence data on an address region, whose upper bit field constituted by upper bits than the n-th bit is a combination of a bit string representing the state value of a new state and a bit string representing a state value of an immediately previous state as shown in FIG. 4, for example. Thus, the sequence storing section 12 can easily designate sequence data corresponding to a given pair of a new state and an immediately previous state. Here, the sequence data to be stored in the sequence storing section 12 having the above-described configuration may be written into the sequence storing section 12 from the outside through a bus interface and the like, before the control target 100 starts to be controlled.

The sequence data selecting section 14 selects, on reception of a state from the outside, sequence data associated with a pair of the received state and an immediately previously received state. For example, the sequence data selecting section 14 includes a state storing section 22, a state monitoring section 24, and a selecting section 26.

The state storing section 22 stores thereon an immediately previously received state. In the present embodiment, the state storing section 22 has a state storing flip-flop circuit 28. The state storing flip-flop circuit 28 receives a state from the outside through the input end thereof. The state storing flip-flop circuit 28 receives, as the enable signal, an address end signal that is generated when the last control signal of the sequence data is output. Thus, the state storing flip-flop circuit 28 can store an immediately previous state, when the sequence data selecting section 14 newly receives a state from the outside.

The state monitoring section 24 detects a state change when the newly received state is different from the immediately previous state stored on the state storing section 22. In the present embodiment, the state monitoring section 24 generates a start signal when detecting such a state change.

The selecting section 26 selects sequence data associated with the pair of the new state and the immediately previous state, when the state monitoring section 24 detects the state change. In the present embodiment, the selecting section 26 combines together the bit string representing the state value of the new state and the bit string representing the state value of the immediately previous state, and outputs the combined bit strings to designate the sequence data associated with the pair of the new state and the immediately previous state. Alternatively, the selecting section 26 may generate a new different data string based on the pair of the state value of the new state and the state value of the immediately previous state and output the generated new data string to designate the associated sequence data.

The sequence reading section 16 sequentially reads, from the sequence storing section 12, the control signals and the pieces time interval information included in the sequence data selected by the sequence data selecting section 14. The sequence reading section 16 sequentially supplies the read control signals to the control target 100. The sequence reading section 16 keeps the last control signal of the sequence data being supplied to the control target 100 after having completed processing the selected sequence data. Furthermore, the sequence reading section 16 supplies the read pieces of time interval information to the time control section 18.

For example, the sequence reading section 16 may sequentially read a plurality of control signals and a plurality of pieces of time interval information included in the selected sequence data, by designating the addresses of the sequence storing section 12 on which the control signals and the pieces of time interval information are stored. In this case, the sequence reading section 16 may obtain the addresses on which the corresponding sequence data is stored, based on the pair of the new state and the immediately previous state, for example. More specifically, the sequence reading section 16 may treat the data that is output from the sequence data selecting section 14 and is obtained by combining together the bit string representing the state value of the new state and the bit string representing the state value of the immediately previous state, as the upper bit fields of the addresses on which the corresponding sequence data is stored. Furthermore, the sequence reading section 16 may sequentially calculate the addresses on which the corresponding sequence data is stored, by assigning a predetermined initial value to the lower bit field of the start address of the corresponding sequence data.

In the present embodiment, the sequence reading section 16 includes an address pointer 32 and a producing section 34, which together constitute a circuit that designates an address on the sequence storing section 12. The address pointer 32 receives the above-mentioned start signal and a time interval end signal. The time interval end signal indicates a time point at which a time interval designated by time interval information has elapsed after the sequence reading section 16 reads and supplies a corresponding control signal to the control target 100.

The address pointer 32 stores thereon a value (for example, 0) that is indicative of the lower bit field of the start address of sequence data in response to the reception of the start signal. The address pointer 32 also increments by one the value stored thereon in response to the reception of the time interval end signal. The address pointer 32 supplies the value stored thereon to the producing section 34.

The address pointer 32 further generates the above-mentioned address end signal when the value stored thereon matches a value corresponding to the number of the control signals included in the corresponding sequence data. Thus, the address pointer 32 can output the address end signal in response to the output of the last control signal included in the corresponding sequence data.

The producing section 34 designates an address to the sequence storing section 12 based on the data output from the sequence data selecting section 14 and the value stored on the address pointer 32. More specifically, the producing section 34 produces address data whose upper bit field has a value corresponding to the data that is output from the sequence data selecting section 14 and obtained by combining together the bit string representing the state value of the new state and the bit string representing the state value of the immediately previous state and whose lower bit field has a value corresponding to the value stored on the address pointer 32. The producing section 34 supplies the produced address data to the sequence storing section 12.

In the above-described fashion, the sequence reading section 16 relating to the present embodiment can designate an address to the sequence storing section 12. By referring to the address designated by the sequence reading section 16, the sequence storing section 12 outputs the control signal and time interval information stored on the designated address.

In the present embodiment, the sequence reading section 16 further includes an OR circuit 36, a timing adjusting flip-flop 38, and an output signal storing flip-flop 40, which together constitute a circuit that enables the control signal output from the sequence storing section 12 to be output to the outside. The OR circuit 36 outputs a signal representing a logical OR between the start signal and the time interval end signal. The timing adjusting flip-flop 38 stores the signal output from the OR circuit 36. Configured in this way, the OR circuit 36 and the timing adjusting flip-flop 38 can output a signal representing a time point at which the address data supplied to the sequence storing section 12 changes.

The output signal storing flip-flop 40 receives the control signal output from the sequence storing section 12. For example, the output signal storing flip-flop 40 may receive the value of the control signal portion (for example, the upper bit field) of the bit string output from the sequence storing section 12.

The output signal storing flip-flop 40 receives, as the enable signal, the signal output from the timing adjusting flip-flop 38. Thus, the output signal storing flip-flop 40 can acquire the control signal output from the sequence storing section 12 at the time point at which the address data supplied to the sequence storing section 12 changes. The output signal storing flip-flop 40 supplies, to the control target 100, the control signal stored therein as the output signal.

As described above, the sequence reading section 16 relating to the present embodiment can sequentially read a predetermined number of control signals and a predetermined number of pieces of time interval information included in the sequence data selected by the sequence data selecting section 14 and sequentially supply the control signals to the control target 100. Furthermore, the sequence reading section 16 can keep the last control signal of the selected sequence data being supplied to the control target 100 even after having completed processing the sequence data.

The time control section 18 refers to each of the pieces of time interval information sequentially read by the sequence reading section 16 to control the time interval during which the corresponding control signal is kept supplied to the control target 100. For example, the time control section 18 may receive the value of the time interval information portion (for example, the lower bit field) of the bit string output from the sequence storing section 12.

For example, the time control section 18 may control the sequence reading section 16 to read and supply a control signal to the control target 100 after a time interval designated by the immediately previous time interval information has elapsed after the sequence reading section 16 reads and supplies the immediately previous control signal to the control target 100. In the present embodiment, the time control section 18 includes a timer 42. The timer 42 generates the time interval end signal after a time interval designated by time interval information has elapsed after the sequence reading section 16 reads and supplies a corresponding control signal to the control target 100. The timer 42 supplies the generated time interval end signal to the address pointer 32 and the OR circuit 36.

Having the above-described configuration, the sequence control apparatus 10 can output, to the control target 100, a sequence of control signals determined by a pair of a state newly received from the outside and a state immediately previously received. Furthermore, the above-described sequence control apparatus 10 can control each of the intermediate states during the transition from a given state to a new state to be sustained for a predetermined time interval.

Figure 5:
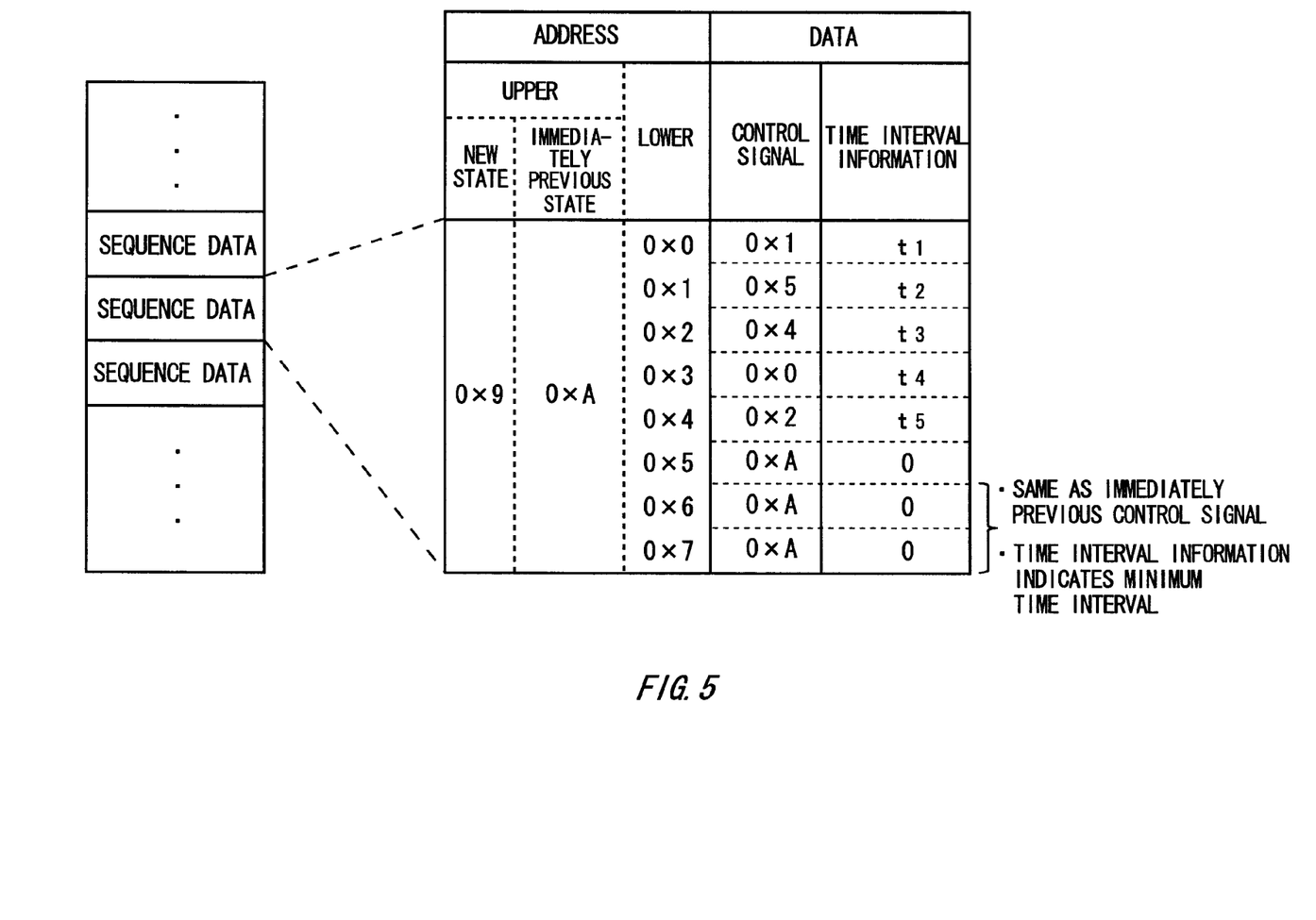
FIG. 5 illustrates exemplary sequence data stored on the sequence storing section 12.

FIG. 5 illustrates exemplary sequence data stored on the sequence storing section 12. In the present embodiment, the sequence storing section 12 stores sequence data including a predetermined number of (for example, eight) control signals and a predetermined number of pieces of time interval information, in association with each pair of a new state and an immediately previous state.

When the number of times at which the control signals to be supplied to the control target 100 in association with a given pair of a new state and an immediately previous state change from their immediately previous control signals is smaller than the predetermined number, at least one of the control signals is the same as the immediately previous control signal in the sequence data stored on the sequence storing section 12 in association with the given pair of the new state and the immediately previous state. In this manner, even if the sequence data is always required to have the predetermined number of control signals, the sequence storing section 12 can store sequence data in which the control signals change from their immediately previous control signals at times the number of which is smaller than the predetermined number.

For example, at least a given one of the control signals is the same as the immediately previous control signal and the time interval information corresponding to the given control signal represents a minimum settable time interval in the sequence data stored on the sequence storing section 12 in association with a pair of a new state and an immediately previous state. Furthermore, two or more last successive control signals may be the same in the sequence data stored on the sequence storing section 12 in association with a given pair of a new state and an immediately previous state. In a case where the sequence storing section 12 stores such sequence data, the sequence data can be generated by using a simple algorithm when the control signals change from their immediately previous control signals at times the number of which is smaller than the predetermined number.

Figure 6:
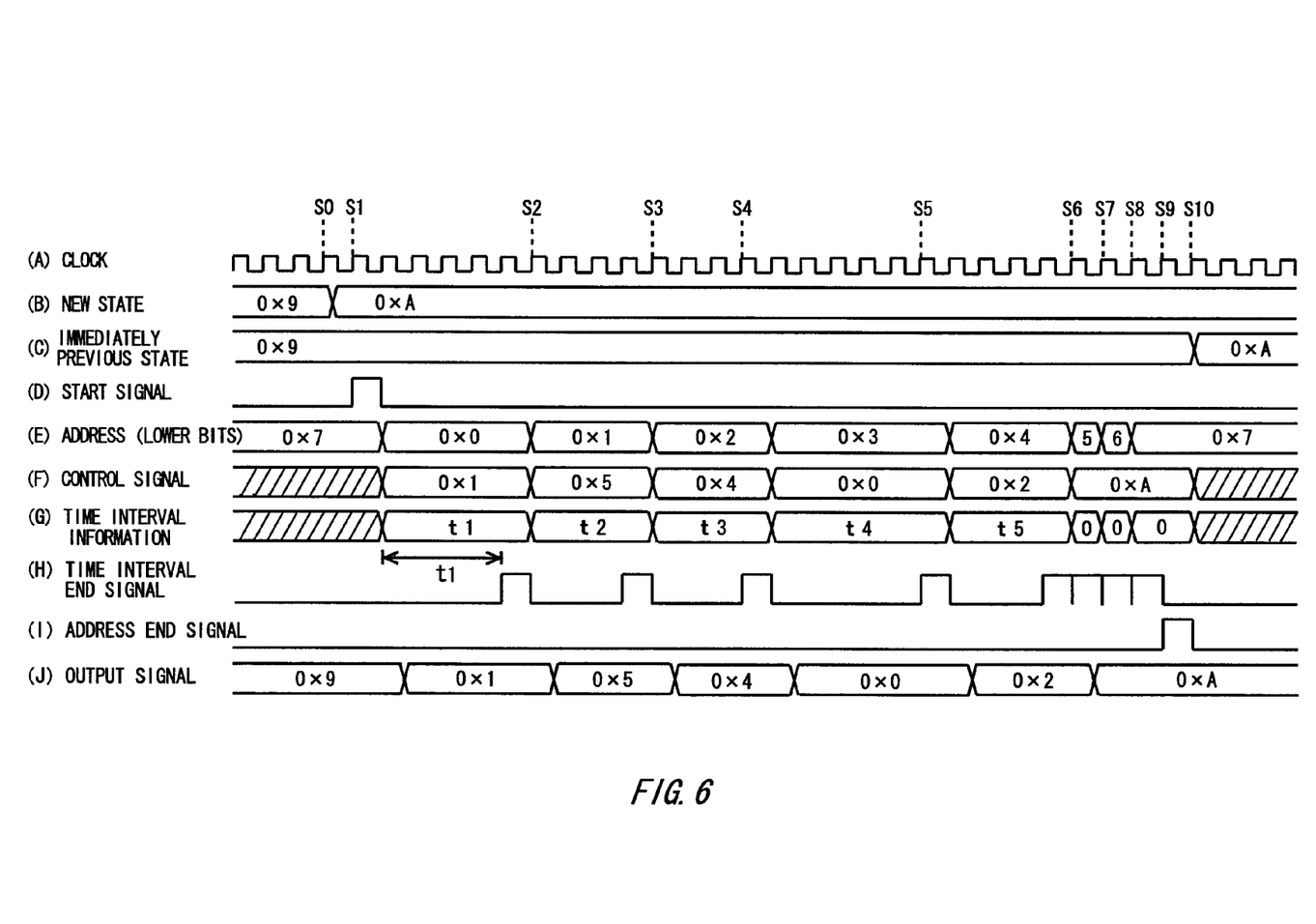
FIG. 6 illustrates an exemplary timing chart of the sequence control apparatus 10, in which (A) shows an exemplary timing chart of the clock within the sequence control apparatus 10, (B) shows an exemplary timing chart of a newly received state, (C) shows an exemplary timing chart of an immediately previously received state, (D) shows an exemplary timing chart of a start signal, (E) shows an exemplary timing chart of an address (lower bits), (F) shows an exemplary timing chart of a control signal, (G) shows an exemplary timing chart of time interval information, (H) shows an exemplary timing chart of a time interval end signal, (I) shows an exemplary timing chart of an address end signal, and (J) shows an exemplary timing chart of an output signal.

FIG. 6 illustrates exemplary timing charts of the signals exchanged within the sequence control apparatus 10. In FIG. 6, (A) shows the clock, (B) shows the new state received from the outside, (C) shows the immediately previous state, and (D) shows the start signal.

In FIG. 6, (E) shows the value generated by the address pointer 32 (in other words, the lower bit field of the address data supplied to the sequence storing section 12), (F) shows the control signal output from the sequence storing section 12, and (G) shows the time interval information output from the sequence storing section 12.

In FIG. 6, (H) shows the time interval end signal, (I) shows the address end signal, and (J) shows the output signal supplied to the control target 100.

When the state received from the outside changes (for example, from "0x9" to "0xA"), the state monitoring section 24 generates the start signal (S0). At the same time, the selecting section 26 outputs, as the upper bit field of an address on the sequence storing section 12, the data obtained by combining together the bit string representing the state value of the new state (for example, 0xA) and the bit string representing the state value of the immediately previous state (for example, 0x9).

On reception of the start signal, the address pointer 32 resets the value of the lower bit field of the address on the sequence storing section 12 to an initial value (for example, 0x0) (S1). As a result of this, the sequence storing section 12 outputs a control signal (for example, 0x1) and time interval information (t1) from the designated address. The output signal storing flip-flop 40 supplies, to the control target 100, the control signal (for example, 0x1) output from the sequence storing section 12.

Subsequently, the time control section 18 generates the time interval end signal when a time interval t1 has elapsed after the time point S1. On reception of the time interval end signal, the address pointer 32 increments by one the value of the lower bit field of the address (S2). As a result of this, the sequence storing section 12 outputs a control signal (for example, 0x5) and time interval information (t2) from the designated address. The output signal storing flip-flop 40 outputs the control signal received from the sequence storing section 12 (for example, 0x5). After this, the sequence control apparatus 10 repeats the operations performed between the time points S1 and S2, until the time point S6 (S3, S4, S5 and S6).

When a minimum time interval (for example, one clock cycle) has elapsed after the time point S6, the time control section 18 generates the time interval end signal. On reception of the time interval end signal, the address pointer 32 increments by one the value of the lower bit field of the address (S7). As a result of this, the sequence storing section 12 outputs a control signal (for example, 0xA) that is the same as the immediately previous control signal and represents the state value of the new state. At the same time, the sequence storing section 12 outputs time interval information representing the minimum time interval (for example, 0). The output signal storing flip-flop 40 supplies to the control target 100 the control signal (for example, 0xA) that is the same as the immediately previous control signal.

After this, the time control section 18 generates the time interval end signal when the minimum time interval (for example, one clock cycle has elapsed after the time point S7. On reception of the time interval end signal, the address pointer 32 increments by one the value of the lower bit field of the address (S8). As a result, the sequence storing section 12 outputs a control signal (for example, 0xA) that is the same as the immediately previous control signal and represents the state value of the new state. At the same time, the sequence storing section 12 outputs time interval information representing the minimum time interval. The output signal storing flip-flop 40 supplies to the control target 100 the control signal (for example, 0xA) that is the same as the immediately previous control signal.

After this, the address pointer 32 generates the address end signal on reception of the time interval end signal (S9). In other words, the address pointer 32 detects that the result of incrementing by one the value of the lower bit field of the address at the time point S8 matches the value (for example, 0x7) corresponding to the predetermined number of control signals included in the sequence data, and thus outputs the address end signal representing that the last control signal has been output. After this, the address pointer 32 does not change the value of the lower bit field of the address. Accordingly, the output signal storing flip-flop 40 continues supplying to the control target 100 the control signal (for example, 0xA) that is the same as the immediately previous control signal and represents the state value of the new state. In this manner, the sequence control apparatus 10 can maintain the control target 100 in the new state.

Subsequently, on reception of the address end signal, the state storing flip-flop circuit 28 acquires the state received from the outside (for example, 0xA), as the immediately previous state (S10). Thus, the sequence control apparatus 10 can enter into a standby mode for a new state.

Figure 7:
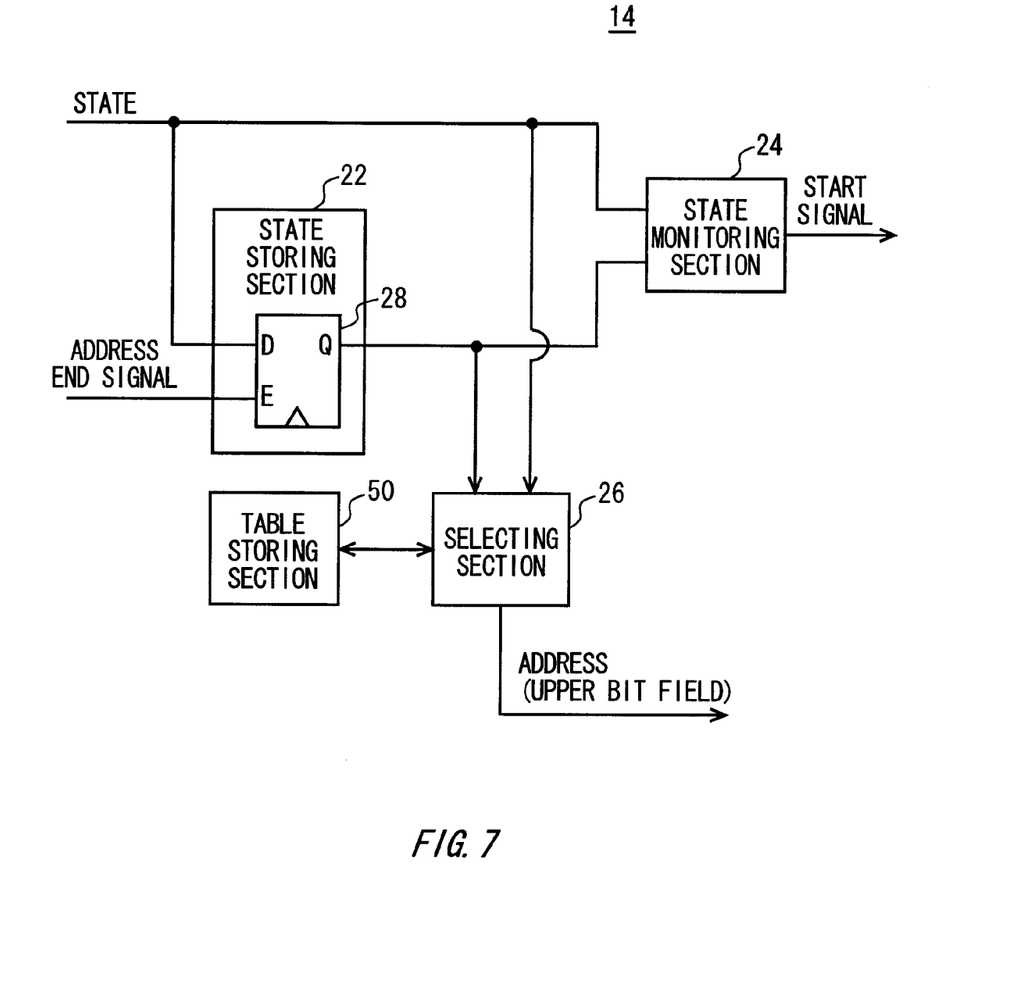
FIG. 7 illustrates the configuration of a sequence data selecting section 14 relating to a modification example of the embodiment.

FIG. 7 illustrates the configuration of the sequence data selecting section 14 relating to a modification example of the embodiment. The sequence control apparatus 10 relating to the modification example has substantially the same configurations and functions as the sequence control apparatus 10 relating to the above-described embodiment. Therefore, some of the constituents of the sequence control apparatus 10 relating to the modification example that have substantially the same configurations and functions as the corresponding constituents of the sequence control apparatus 10 relating to the above-described embodiment are assigned with the same reference numerals as in the above-described embodiment. The modification example is described with a main focus of its differences from the above-described embodiment.

According to the modification example, the sequence data selecting section 14 may additionally include a table storing section 50. The table storing section 50 stores thereon a conversion table, in which each pair of a new state and an immediately previous state is associated with a start address from among the addresses on which corresponding sequence data is stored. In the modification example, when a state change is detected, the selecting section 26 reads from the table storing section 50 a start address for sequence data associated with a pair of a new state and an immediately previous state.

In the sequence control apparatus 10 relating to the above-described modification example, the sequence storing section 12 can store each piece of sequence data on any desired location. Accordingly, in the sequence control apparatus 10 relating to the modification example, the sequence storing section 12 does not need to store sequence data associated with a pair of a new state and an immediately previous state that will never be received from the outside. In the sequence control apparatus 10 relating to the modification example, each piece of sequence data can be adapted to include a different number of control signals. In this manner, the sequence storing section 12 can store sequence data in an efficient manner in the sequence control apparatus 10 relating to the modification example.

When the sequence storing section 12 stores, in association with each pair of a new state and an immediately previous state, sequence data including a predetermined number of control signals and a predetermined number of pieces of time interval information, the sequence reading section 16 may desire to output a sequence of control signals the number of which is larger than the predetermined number, in response to a given pair of a new state and an immediately previous state. In this case, the sequence data selecting section 14 may perform the following operations. Specifically speaking, the sequence control apparatus 10 supplies the predetermined number of control signals included in first sequence data to the control target in response to the reception of the new state. After this, the sequence data selecting section 14 stores, onto the state storing section 22, an intermediate state, instead of storing the new state onto the state storing section 22. After this, the state monitoring section 24 detects a state change when the new state is different from the intermediate state stored on the state storing section 22. When the state change is detected, the selecting section 26 selects second sequence data associated with a pair of the new state and the intermediate state.

To sum up, when receiving a new state from the outside, the sequence data selecting section 14 selects corresponding first sequence data. Subsequently, the sequence data selecting section 14 can select corresponding second sequence data. In this manner, the sequence control apparatus 10 can output a sequence of control signals the number of which is larger than the predetermined number.

Figure 8:
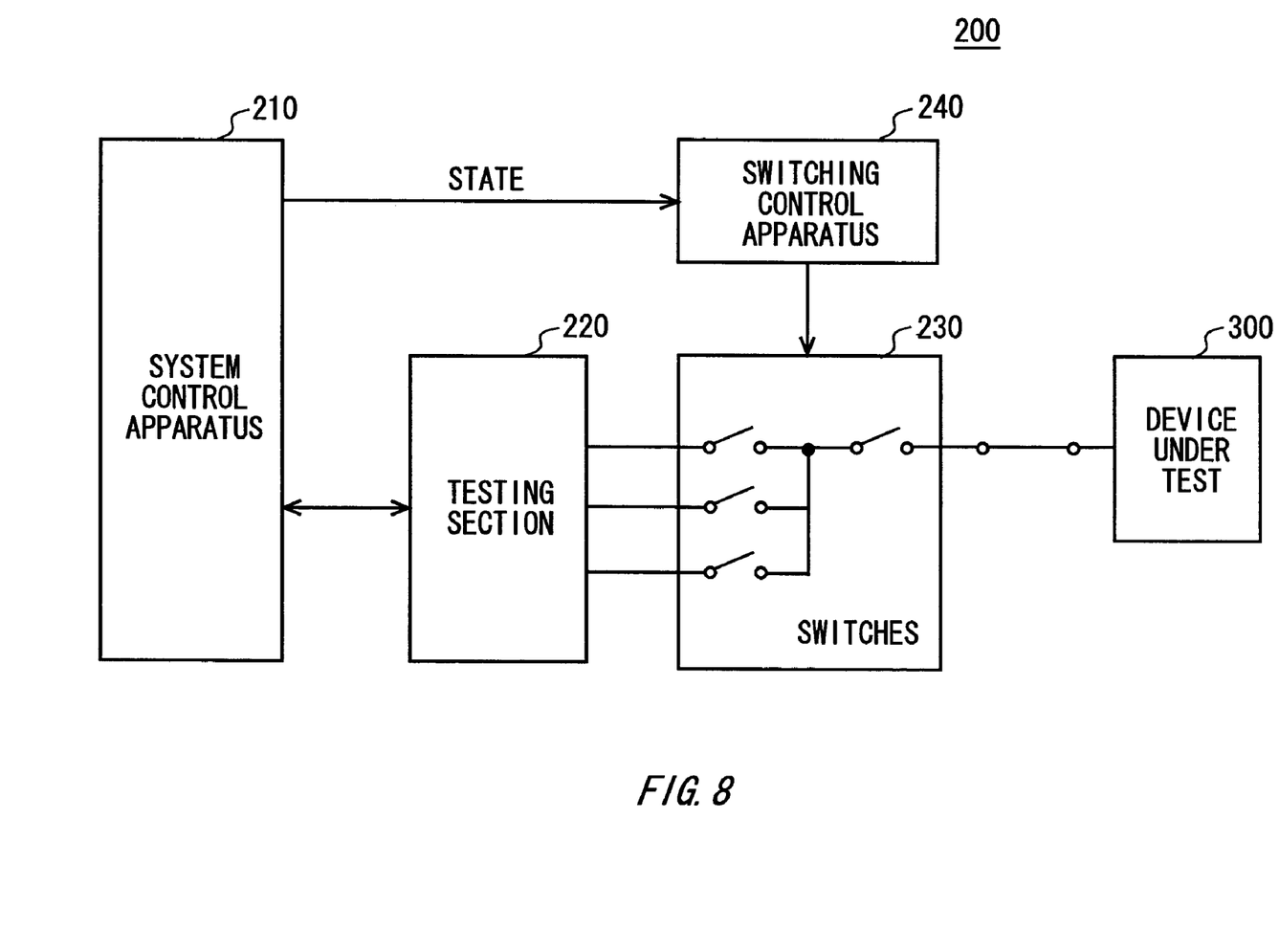
FIG. 8 illustrates the configuration of a test apparatus 200 relating to an embodiment of the present invention, together with a device under test 300.

FIG. 8 illustrates the configuration of a test apparatus 200 relating to an embodiment of the present invention together with a device under test 300. While the test apparatus 200 shown in FIG. 8 is described in the following, some constituents having substantially the same configuration and functions as the corresponding constituents of the sequence control apparatus 10 described with reference to FIGS. 1 to 7 are assigned with the same reference numerals as in FIGS. 1 to 7. The test apparatus 200 is described with a main focus of its differences from the sequence control apparatus 10.

The test apparatus 200 is designed to test the device under test 300. The test apparatus 200 includes a system control apparatus 210, a testing section 220, a plurality of switches 230, and a switching control apparatus 240. The system control apparatus 210 controls the test performed on the device under test 300. The testing section 220 tests the device under test 300 by exchanging signals with the device under test 300.

The switches 230 are used to switch whether the testing section 220 and the device under test 300 are connected to each other. For example, the switches 230 may establish (ON) or cut off (OFF) the connections provided by the signal lines for a test signal that is supplied from the testing section 220 to the device under test 300, a response signal that is output from the device under test 300 to the testing section 220, and a direct current voltage signal that is supplied from the testing section 220 to the device under test 300.

The switching control apparatus 240 outputs a sequence of control signals designed to operate the switches 230, thereby controlling the ON/OFF states of the switches 230. The switching control apparatus 240 has substantially the same configurations and functions as the sequence control apparatus 10 shown in FIG. 3. The switching control apparatus 240 treats the switches 230 as the control target 100.

When the sequence control apparatus 10 is used in the above-described context, the system control apparatus 210 supplies to the switches 230 in order to designate the states of the switches 230, connection information representing the type of the combination of the ON/OFF states of the switches 230, prior to each of the tests that are to be sequentially performed. The switching control apparatus 240 operates in a similar manner as the sequence control apparatus 10 shown in FIG. 3, and thus sequentially supplies a plurality of control signals to the switches 230, which are associated with the pair of the immediately previous state and the new state received from the system control apparatus 210. Thus, the sequence control apparatus 10 can switch the states of the switches 230 by using an appropriate sequence of control signals prior to each test.

Although some aspects of the present invention have been described by way of exemplary embodiments, it should be understood that those skilled in the art might make many changes and substitutions without departing from the spirit and the scope of the present invention which is defined only by the appended claims.

What is claimed is:

1. A sequence control apparatus for outputting a sequence of control signals to operate a control target, comprising:
   a sequence storing section that stores thereon sequence data in association with each state received from outside, the sequence data including a plurality of control signals to be sequentially supplied to the control target and a plurality of pieces of time interval information designating time intervals during which the plurality of control signals are respectively kept supplied to the control target;
   a sequence data selecting section that, on reception of a state from the outside, selects sequence data associated with the state;
   a sequence reading section that sequentially reads the plurality of control signals and the plurality of pieces of time interval information included in the selected sequence data and sequentially supplies the plurality of control signals to the control target; and
   a time control section that refers to the plurality of pieces of time interval information sequentially read from the sequence storing section by the sequence reading section to control the time intervals during which the plurality of control signals are kept supplied to the control target, wherein
   the time control section controls the sequence reading section to read a control signal and supply the control signal to the control target, when a time interval designated by an immediately previous piece of time interval information has elapsed after the sequence reading section reads an immediately previous control signal and supplies the immediately previous control signal to the control target,
   the sequence storing section stores, in association with each state received from the outside, the sequence data including a predetermined number of control signals and a predetermined number of pieces of time interval information,
   after sequentially reading the predetermined number of control signals and the predetermined number of pieces of time interval information included in the sequence data selected by the sequence data selecting section and sequentially supplying the predetermined number of control signals to the control target, the sequence reading section keeps a last control signal supplied to the control target after having completed processing the sequence data, and
   when a plurality of control signals to be supplied to the control target in response a given state change from immediately previous control signals thereof at times the number of which is smaller than the predetermined number, the sequence storing section stores, in association with the given state, the sequence data in which at least one of the control signals is the same as an immediately previous control signal.

2. The sequence control apparatus as set forth in claim 1, wherein
   the sequence storing section stores, in association with the given state, the sequence data in which at least one of the control signals is the same as an immediately previous control signal and time interval information corresponding to the at least one control signal designates a minimum settable time interval.

3. The sequence control apparatus as set forth in claim 2, wherein
   the sequence storing section stores, in association with the given state, the sequence data in which last two or more successive control signals are the same as each other.

4. A sequence control apparatus for outputting a sequence of control signals to operate a control target, comprising:
   a sequence storing section that stores thereon sequence data in association with each of a one or more state received from outside, the sequence data including a plurality of control signals to be sequentially supplied to the control target and a plurality of pieces of time interval information designating time intervals during which the plurality of control signals are respectively kept supplied to the control target;
   a sequence data selecting section that, on reception of a state from the outside, selects sequence data associated with the state;
   a sequence reading section that sequentially reads, from the sequence storing section, the plurality of control signals and the plurality of pieces of time interval information included in the selected sequence data and sequentially supplies the plurality of control signals to the control target;
   a time control section that receives the plurality of pieces of time interval information sequentially read from the sequence storing section by the sequence reading section and supplies to the sequence reading section signals associated with the received plurality of pieces of time interval information to control the time intervals during which the plurality of control signals are kept supplied to the control target;
   wherein the sequence storing section stores the sequence data in association with each state received from the outside and further with each state immediately previously received, and the sequence data selecting section includes: a state storing section that stores thereon an immediately previously received state; a state monitoring section that detects a state change when a state newly received is different from the immediately previously received state stored on the state storing section; and a selecting section that, when the state monitoring section detects the state change, selects sequence data based on a pair of the newly received state and the immediately previously received state;
   wherein the sequence storing section stores, in association with each pair of the newly received state and the immediately previously received state, the plurality of control signals and the plurality of pieces of time interval information of the sequence data on a plurality of successive addresses, and the sequence reading section calculates a plurality of addresses on which the sequence data is stored, based on the pair of the newly received state and the immediately previously received state; and wherein the selecting section outputs data obtained by combining together a bit string representing a state value of the newly received state and a bit string representing a state value of the immediately previously received state, and the sequence reading section calculates the plurality of addresses on which the sequence data is stored by (i) assigning the data output from the selecting section as an upper bit field of the plurality of addresses on which the sequence data is stored and (ii) assigning a predetermined initial value to a lower bit field of a start address from among the plurality of addresses on which the sequence data is stored.

5. A sequence control apparatus for outputting a sequence of control signals to operate a control target, comprising:

a sequence storing section that stores thereon sequence data in association with each of a one or more state received from outside, the sequence data including a plurality of control signals to be sequentially supplied to the control target and a plurality of pieces of time interval information designating time intervals during which the plurality of control signals are respectively kept supplied to the control target;

a sequence data selecting section that, on reception of a state from the outside, selects sequence data associated with the state;

a sequence reading section that sequentially reads, from the sequence storing section, the plurality of control signals and the plurality of pieces of time interval information included in the selected sequence data and sequentially supplies the plurality of control signals to the control target;

a time control section that receives the plurality of pieces of time interval information sequentially read from the sequence storing section by the sequence reading section and supplies to the sequence reading section signals associated with the received plurality of pieces of time interval information to control the time intervals during which the plurality of control signals are kept supplied to the control target;

wherein the sequence storing section stores the sequence data in association with each state received from the outside and further with each state immediately previously received, and the sequence data selecting section includes: a state storing section that stores thereon an immediately previously received state; a state monitoring section that detects a state change when a state newly received is different from the immediately previously received state stored on the state storing section; and a selecting section that, when the state monitoring section detects the state change, selects sequence data based on a pair of the newly received state and the immediately previously received state; and wherein the sequence storing section stores, in association with each pair of the newly received state and the immediately previously received state, the sequence data including a predetermined number of control signals and a predetermined number of pieces of time interval information, when the sequence reading section outputs a sequence of control signals the number of which is larger than the predetermined number in association with a pair of a newly received state and an immediately previously received state, the sequence data selecting section first supplies to the control target a predetermined number of control signals included in first sequence data selected in response to reception of the newly received state and then stores an intermediate state onto the state storing section instead of storing the newly received state onto the state storing section, the state monitoring section detects a state change when the newly received state is different from the intermediate state stored on the state storing section, and when the state monitoring section detects the state change, the selecting section selects second sequence data in association with a pair of the newly received state and the intermediate state.

* * * * *